United States Patent [19]

Ulmer

[11] Patent Number: 4,549,097

[45] Date of Patent: Oct. 22, 1985

[54] ELECTRIC SAFETY SWITCH

[76] Inventor: Jamie F. Ulmer, Box 102, Highway 70, Mt. Juliet, Tenn. 37122

[21] Appl. No.: 483,449

[22] Filed: Apr. 11, 1983

[51] Int. Cl.[4] .............................................. H02H 3/00

[52] U.S. Cl. ................................ 307/326; 200/61.85; 200/157

[58] Field of Search ................ 200/61.85, 157, 153 V, 200/153 SC; 307/115, 326; 123/198 DC

[56] References Cited

U.S. PATENT DOCUMENTS

| | | | |
|---|---|---|---|
| 3,953,696 | 4/1976 | Reimann et al. | 200/157 |
| 3,961,146 | 6/1976 | Dummer | 200/157 |

FOREIGN PATENT DOCUMENTS

| | | | |
|---|---|---|---|
| 890198 | 1/1972 | Canada | 123/198 DC |
| 1229219 | 4/1971 | United Kingdom | 200/157 |

*Primary Examiner*—A. D. Pellinen
*Assistant Examiner*—Morris Ginsburg
*Attorney, Agent, or Firm*—Pitts and Brittian

[57] ABSTRACT

A control switch proximate a support handle of a power driven machine provides for emergency deenergization of the machine without releasing the operator's grip on the support handle. The apparatus of this invention includes a control member (60) which moves from an at rest position along a selected direction (78) and against a first biasing force (70), (36) by motion of the operator's finger and further to an emergency off position by further motion of the operator's finger. A first biasing force (36), (70) continually urges the control member (60) to the at rest position. An activating means such as sliding contact switch (54), (56) and (66) is responsive to movement of the control member (60), and is connected to the driving source of the machine such that the driving source is in a nonoperating condition when the control member is in the at rest position and is in operating condition when the control member is moved to the energizing position. A second biasing force (84), (40) is provided which is stronger or in addition to and requires more force than the first biasing force to resist further motion. A deactivating means such as a normally closed emergency off switch (58) is responsive to further movement of the control member (60) to the emergency off position and will deenergize the machine such that a panic tightening of the operator's grip results in the machine being brought to a stop.

9 Claims, 8 Drawing Figures

ELECTRIC SAFETY SWITCH

TECHNICAL FIELD

This invention relates generally to means for energizing and deenergizing machines by a control member or switch, and more particularly to a switching means which operates in a normal mode to turn the machine on and off and further includes means for operating in a panic or emergency mode for deenergizing the machine if during an emergency the operator panics and increases his grip on the support handle of the machine. It is well known, that in the typical situation, it is necessary to relax the grip, at least on the trigger mechanism, to deenergize the machine. However, this relaxation on the trigger mechanism is contrary to the natural instincts of the operator.

BACKGROUND ART

As will be appreciated by those skilled the art, many hand held power tools may pose considerable danger to the operator if not handled with care. Further, even when great care is exercised many of these hand held tools, whether driven by gasoline or electric motors, still inflict many injuries every year to the operators for various reasons. Sometimes the reason is nothing more than momentary carelessness by the operator, but often times the injury occurs because of some malfunction in the operation. For example with respect to hand held saws such as circular saws and even chain saws, striking a hard foreign member with the blade such as, for example, a nail or a hard knot in the wood, has been known to make the saw either kick back or to bind. Since the operator is aware of the danger posed by the saw if not kept under control, in such an emergency the operator's natural tendancy is to grip the handle of the tool or saw more firmly to assure that the saw does not become uncontrolled. Unfortunately, with most such tools the control mechanism such as an on and off switch for an electric motor or the speed control switch of a gasoline motor is usually controlled by one or more fingers of the supporting hand. Thus, when the emergency occurs and the operator grasps the handle more firmly, in the usual case he also inadvertently continues his grasp on the on and off switch or the speed control switch thereby preventing the machine from coming to a halt. It is clear that the operator needs to hold firmly to the tool, while at the same time releasing any pressure on the control member or switch itself. Unfortunately, in a panic situation holding tight on the handle while at the same time releasing the control member usually will just not occur by even the experienced operator.

Therefore, it is an object of the present invention to provide a control member which will deenergize the machine while the operator continues to firmly grip the handle of the machine.

Although an investigation of the prior art indicates that many types of switches for different purposes such as snap action switches used to avoid arcing, switches which incorporate a breaker mechanism for disengaging the electrical power to the switch in the case of an overload, and switches that require a first conscious positive action before the energizing switch can be activated are already available in the prior art. Furthermore, patents disclosing motor driven hand tools using trigger and handle activated motors are also disclosed in the prior art. For example, U.S. Pat. No. 3,292,673 issued to E. J. Gregory on Dec. 20, 1966, discloses a typical circular saw activated by a standard finger switch within the handle illustrative of the common type trigger switch. It is this type of trigger switch that must be released in the case of binding of the saw blade. Yet, since the trigger switch is in the handle the natural tendency of the operator is to squeeze more firmly. The other patents with respect to on and off switches of power tools include U.S. Pat. No. 3,869,590 issued to H. W. Hults on March 4, 1975, U.S. Pat. No. 3,881,081 issued to R. Schilling, et.al. on April 20, 1975, and U.S. Pat. No. 4,286,125 issued to A. Schaffler, et.al. on Aug. 25, 1981. These patents are particularly relevant to providing good on and off contact action, More specifically, these patents disclose snap action electrical switching to avoid arcing within the switch. Also shown are safety guarded switches such that the switch cannot be activated unless clearly intended by the operator. However, none of these patents show any type of secondary switching action such that the switch will go to an off position in an emergency or panic situation.

U.S. Pat. No. 3,009,999 issued to D. W. Johnson on Nov. 21, 1961 and U.S. Pat. No. 4,149,053 issued to Eric L. Long on April 10, 1979 teach safety type switches. For example, the Johnson patent shows a technique whereby the switch also includes an overload sensing capability such that if the saw or machine is used in an electrical overload condition for a predetermined amount of time, the switch will open by means of bimetal elements thereby preventing any damage to the motor of the machine and also preventing further use of the machine until the overload condition is corrected. The Long patent, on the other hand, utilizes a technique, such that in the event the electrical contacts are welded in the closed position by arcing, power may still be removed from a power tool by means of a secondary switching connection which will come into play only when the contacts are in such a welded condition. Thus, according to this patent the tool will be deenergized when the trigger is released even if the contacts are welded closed. However, it can be seen from these patents that neither of them are concerned with the emergency situation where the operator of the circular saw or other machine should be turning the switch off by releasing pressure thereon, but instead in a panic state grips the handle lighter and consequently the switch is gripped even tighter thus maintaining electrical power to the saw.

Therefore, it is another object of this invention to provide switching methods and apparatus wherein panic gripping of the support handle with a switch incorporated therewith results in the machine being deenergized to provide a safe condition.

It is still another object of this invention to provide switching methods and apparatus which incorporate an off-on-off switching arrangement.

It is yet another object of the invention to provide switching methods and apparatus which allow safe deenergization of the machine driven apparatus which are both inexpensive and easy to incorporate.

DISCLOSURE OF THE INVENTION

Other objects and advantages will in part be obvious, and will in part appear hereinafter, and will be accomplished by the present invention which provides switching methods and apparatus by the use of a control switch for operating proximate a support handle of a machine for grasping and supporting the machine and wherein the switch is activated by the finger or another portion of the operator's hand. The control switch provides for emergency deenergization of the driving source of the machine without release of the operator's grip on the handle. The switch comprises a control member movable from an "at rest" position along a selected direction and against a first biasing force to an "energizing" position by a portion of an operator's hand such as the trigger finger. However, increased force by the operator's hand against the control member will result in the control member moving to an emergency off position against a second and stronger biasing force. The first biasing force is used to continually urge the control member to the "at rest" position. Also provided is an activating means such as an electrical normally open switch which is responsive to movement of the control member and, of course, is also connected to the driving source of the machine such that the driving source is in a nonoperating condition when the control member is in the "at rest" position and is in an operating condition when the control member is in the "energized" position. The second biasing force is stronger and will provide more resistance against movement than the first biasing force. Also included is deactivating means such as a normally closed electrical switch which is responsive to movement of the control member to the emergency off position and which switch will deenergize the driving source of the machine such that a panic tightening of the operator's grip will result in the switch contacts opening and the machine being stopped.

BRIEF DESCRIPTION OF THE DRAWINGS

The above-mentioned features of the present invention will be more clearly understood from the consideration of the following description in connection with the accompanying drawings in which.

BEST MODE FOR CARRYING OUT THE INVENTION

Figure 1:
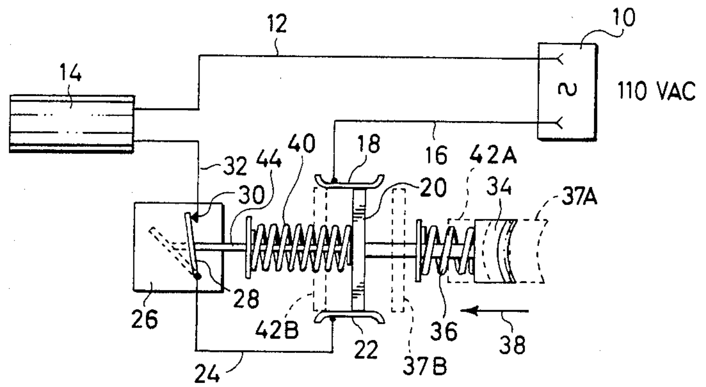
FIG. 1 is a general electrical schematic of a machine incorporating the safety switch of this invention.

Referring now to FIG. 1, there is shown a schematic of electrical circuitry used in an electrical motor driven power tool and incorporating the features of this invention. As shown, in a typical embodiment, AC 110 volt power is received at power inlet connection 10. One of the two power lines 12 goes directly to the electrical motor 14. The other power line 16 is connected by suitable means such as solder or crimping to slide contact 18. Electrically conducting contact slider 20 is in contact with slide contact 18 and is also in contact with opposing slide contact 22, such that electrical current may flow from wire 16 to connecting wire 24 (also connected by suitable means such as soldering or crimping to slide contact 22). The other end of connecting wire 24 terminates at emergency off switch 26. Emergency off switch 26 includes normally closed contacts 28 and 30 such that electrical current can flow from connecting wire 24 through contacts 28 and 30 of emergency off switch 26 to wire 32, and then on to motor 14 thereby allowing the motor to be energized by the electrical power. As shown in FIG. 1, contact slider 20 is in the on position which means, that the trigger member 34 has been depressed against a biasing force such as spring 36 to the position as shown. Phantom lines 37A and 37B respectively show the trigger 34 and contact slider 20 in its at rest and normal off condition. In this normal off position, of course, there is no electrical connection between slide contact 18 and slide contact 22. Thus, to operate the machine, it is simply necessary to depress trigger member 34 in the direction indicated by arrow 38 to the solid line and normal "on" position as shown. However, in the event of an emergency it will be appreciated by those skilled in the art that the operator's normal reaction will be to tighten his grip more firmly on the handle of the machine and consequently also on trigger member 34. In the embodiment as shown, the result of further tightening causes the trigger member 34 to travel even further in the direction of arrow 38 against a second bias or spring means 40 to the second phantom position of trigger 34 as illustrated by reference numbers 42A and 42B. In this situation, it will be appreciated that contact slider 20 will push against push rod 44 which is connected to contact 28 in emergency off switch 26. Thus, in response to the grip and the movement of the trigger 34 contact 28 of emergency switch 26 will be moved to the off or deenergized position as shown by the phantom lines. Of course, once the emergency off switch 26 is open, power will be disconnected from driving motor 14 and the hand tool will be brought to a halt. Thus, from this schematic there has been shown the method and control features of this invention.

Figure 2:
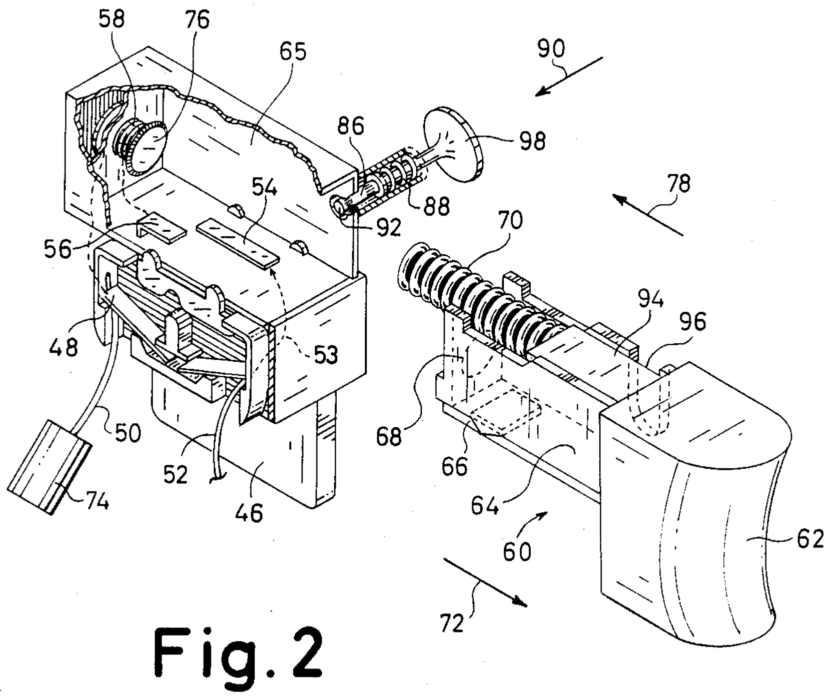
FIG. 2 discloses a perspective view of an electrical safety switch of this invention having dimensions and shape compatable with and suitable for use with many of todays electrical powered hand tools.
Figure 3A:
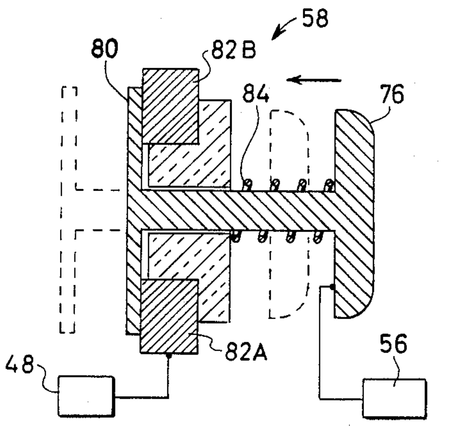
FIGS. 3A and 3B illustrate a diagramatic representation of how the electrical circuitry of the switch of FIG. 2 operates to incorporate the at rest off-on-emergency off position of the switch.
Figure 3B:
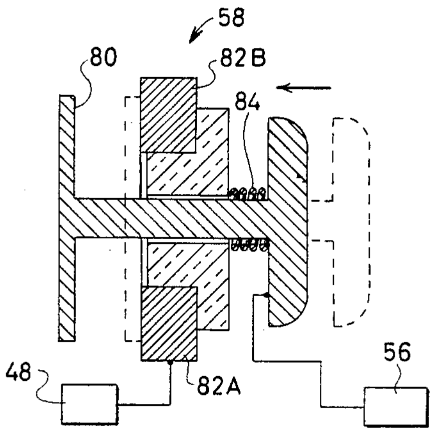

Referring now to FIG. 2, there is shown a partially cut away perspective view of a typical drop in switch commonly used in certain power tools such as, for example, a circular saw. As shown, the power tool includes a base housing 46 having a first friction connection 48 for receiving wire 50 and a second friction connection not shown for receiving wire 52. Although not shown, except by schematic representation of dashed line 53, electrical wire 52 will include an electrical connection to slide contact 54. A second energizing contact slide 56 also includes an electrical connection to wire 50. However, this electrical connection is first routed through emergency off switch 58 and then to wire 50 as will be discussed later. Operating in conjunction with housing 46 is a control member mechanism 60. This control member mechanism 60 includes a trigger member 62 which is typically gripped with the trigger finger of the operating hand and also includes a slide housing 64 which lies within the box like aperture 65 of base housing 46. Included with slide housing 64 is a metal electrical conducting contact slider 66. A first spring or biasing means 70 operates to urge the control member mechanism 60 to its normal at rest and deenergized position in the direction indicated by arrow 72. Thus, in the "at rest" or off position contact slider 66 will ride on slide contact 54 but will not be in contact with slide contact 56. Thus, it will be appreciated that electrical power entering through wire 52 will not complete a circuit to slide contact 56. To operate the machine, it is only necessary to simply grip the handle of the hand tool and squeeze trigger mechanism 62 thereby moving contact slider 66 along slide contact 54 until contact slider 66 contacts slide contact 56 and provides an electrical path from wire 52 through slide contact 54 through contact slider 66 to slide contact 56 through emergency off switch 58 and then out through friction contact connection 48 and wire 50 to electrical motor 74. Thus, a force against trigger 62 and consequently against biasing means 70 moves the contact slider 66 into contact with slide contact 54 and 56 to complete the electrical circuit. Also, the energizing force and movement will typically be continued until contact portion 68 of insulating housing 64 comes in contact with the stop post 76 of emergency off switch 58. As shown, and as can be more clearly seen in FIGS. 3A and 3B, an electrical circuit does exist between slide contact 56, stop post 76 and friction contact 48. FIG. 3A shows the emergency switch 58 in its normally closed position such that the electrical circuit can be made. However, it will be appreciated that in the emergency situation when the operator instinctively more firmly grasps the handle of the tool and consequently the trigger of the tool, any additional force against trigger 62 will cause additional motion of contact portion 68 along the arrow 78, and will move stop post 76 and also integrally made contact plate 80 away from contacts 82A and 82B. As FIG. 3B shows, the stop post 76 has been moved to its emergency off position. Also included is a second spring or biasing force 84 which constantly urges stop post 76 in the normally closed position such that electrical circuitry is maintained through contact 80 and 82.

In an improved embodiment of this same switch, there is also a locking pin 86 which is continually urged against spring or biasing force 88 in the direction indicated by thrust arrow 90. End 92 of lock pin 86 rides against the side area 94 of control member housing 64 during normal operating conditions. However, in the emergency off position, and when the housing is moved to its rearmost position as indicated by arrow 78, the end 92 of lock pin 86 drops into the cut out 96 of side wall 94 thus holding control mechanism 60 in the emergency off position. This "lock out" continues to deenergize the machine until the unsafe condition can be corrected. After unsafe condition is corrected, the locking pin 86 may then be pulled against the biasing spring 88 by means of lift collar 98. Thus, FIGS. 2, 3A and 3B illustrate a control switch incorporating the features of this invention within a typical on and off energizing switch of an electrical hand tool.

Figure 4A:
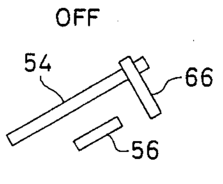
FIGS. 4A, 4B and 4C illustrate another technique of incorporating the at rest off-on-emergency off concept in a switch.
Figure 4B:
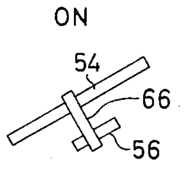
Figure 4C:
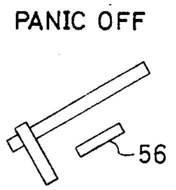

Referring now to FIGS. 4A, 4B and 4C, there is shown a schematic only of an alternate embodiment of FIG. 2 which also incorporates the teachings of this invention. In this embodiment, it will be appreciated that normally closed emergency switch 58 is not necessary. However, stop post 76 with a resilient second biasing force or spring 84 will be still necessary. In the embodiment, FIG. 4A shows the normal deenergized position with slide contact 54 and contact slider 66 operating in same manner as discussed above. However, according to this embodiment, slide contact 56 is of such a size and at such a location that movement to the on position will turn the machine on, but further movement will result in the power being interrupted to the electric motor. FIG. 4B shows the normal on condition whereas FIG. 4C shows the emergency off condition in which contact slider 66 has passed beyond the end of slide contact 56. Thus, it can be seen that according to this technique the contact slider 66 moves to the normally on, and then to an emergency off condition.

Figure 5:
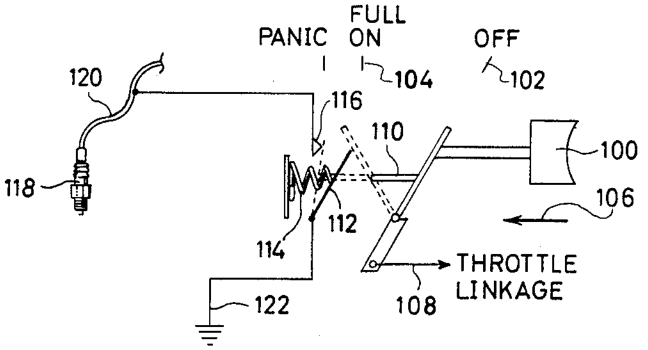
FIG. 5 shows the technique of this invention as it could be used for deenergizing gasoline engine powered tools.

Although this switch has great application for electrical driven hand tool or appliances, it will be appreciated that the features of this invention may also be incorporated in control switches used for other power sources such as gasoline engines. As shown in FIG. 5, there is still a trigger switch 100 which has a first or normal off position 102 and a full on position 104. Movement of the trigger switch 100 in the direction indicated by arrow 106 will result in movement of throttle linkage 108 which in turn will be used to control the speed of the gasoline engine. Also as shown, if the trigger switch 100 is continuously urged in the direction of arrow 106 past the point that stop member 110 makes contact with the normally open contact 112, and against biasing means or spring 114 contact 112 will close and make an electrical connection with contact 116. In the embodiment as shown, the spark plug 118 of the gasoline engine has its high voltage terminal or line 120 connected by an electrical wire or connection to contact 116, and the contact 112 is connected to a grounding source 122. Thus, when the contact 112 is moved against contact 116 the high voltage line 120 of the gasoline engine is grounded out, and as will be appreciated by those skilled in the art, such a grounding will result in the engine being turned off. Again as was discussed above, trigger mechanism 100 may include locking means to hold the mechanism in the emergency off condition until the emergency situation may be corrected.

While there have been described what are presently considered to be preferred embodiments of the safety switch methods and apparatus of this invention, it will be obvious to those skilled in the art that various changes and modifications may be made therein without departing from the spirit of this invention. Therefore, it is intended that this invention cover all such changes and modifications that fall within the true spirit and scope of the invention and as is set forth in the following claims.

I claim:

1. A control switch for mounting in a handle of a hand held power tool and being operated by a finger of an operator grasping such handle, such control switch providing for energization of such tool from a power source and for emergency deenergization of such tool without release of such finger, which comprises:

a switch housing for mounting in such handle;

a control member moveable in said switch housing by such finger sequentially along a selected direction, from an at rest "off" position to an energizing "on" position and to an emergency "off" position;

a first biasing means for resistive force against movement of said control member from said at rest "off" position to said emergency "off" position;

a further biasing means for resistive force against movement of said control member from said energizing "on" position to said emergency "off" position;

first actuating means responsive to movement of said control member from said at rest "off" position to said energizing "on" position for energizing such tool from such power source;

further actuating means responsive to movement of said control member from said energizing "on" position to said emergency "off" position for deenergizing such tool from such power source; and means for automatically releasably locking said control member at said emergency "off" position until reset by such operator.

2. The control switch of claim 1 wherein said first biasing means and said further biasing means provide additive resistive forces as said control member is moved toward said emergency "off" position from said energizing "on" position.

3. The control switch of claim 1 wherein said first actuating means is a normally open switch which is closed as said control member is moved from said at rest "off" position, and said further actuating means is a normally closed switch which is opened when said control member is moved to said emergency "off" position, said first actuating means being connected in series with said further actuating means.

4. The control switch of claim 1 wherein said control member is a substantially straight operator unit having first and further ends, said first end adapted for receiving such finger of such operator and said further end provided for engagement with said further biasing means when said control member moves from said energizing "on" position to said emergency "off" position.

5. The control switch of claim 3 wherein said control member is a substantially straight operator unit for axial movement by such finger of such operator, and said normally open switch comprises a slide contact carried by said control member and a pair of contacts mounted within said housing for engagement with said slide contact as said control member is moved from said at rest "off" position to said energizing "on" position for connecting such tool to such power source.

6. A control switch for mounting in a handle of a hand held electrical tool having an electric motor for operation of such tool, such control switch being operated by a finger of an operator grasping such handle for energizing such motor from an electrical power source and for deenergizing such motor in emergencies without release by such finger, which comprises:

a switch housing for mounting within such handle;

a slide member mounted within said housing having first and further ends, said first end adapted to receive such finger of such operator, said slide member adapted for axial movement within said housing from an at rest "off" position to an energizing "on" position and then to an emergency "off" position;

a first biasing means carried by said slide member to provide a resistive force to said axial movement of said slide member;

an electrical slide contact carried by said slide member;

a first pair of spaced apart fixed electrical contacts mounted within said housing for engagement with said slide contact during said axial movement of said slide member for energizing such motor from such power source;

a further pair of normally contacting electrical contacts carried by said housing with one of said further pair moveable away from the other of said further pair upon motion of said slide member from said energizing "on" position to said emergency "off" position;

a further biasing means interposed between said contacts of said further pair to provide a resistive force against movement of said one contact of said further pair of contacts; and electrical connections for serially connecting said first and further pairs of electrical contacts with such motor and to said power source.

7. The control switch of claim 6 further comprising a releasable interlock carried by said housing for automatic releasable engagement with said slide member when said slide member is in said emergency "off" position whereby to deenergize such motor from such power source until said interlock is released.

8. The control switch of claim 7 wherein said interlock comprises a moveable rod having a first end for engaging said slide member, said slide member provided with an opening for receiving said first end of said rod, a further end adapted for grasp by such operator, and a rod biasing member for automatically moving said rod axially into engagement with said slide member when said rod is aligned with said opening.

9. The control switch of claim 8 wherein said rod biasing member and said first and further biasing means are helical springs, and said first and further biasing means are axially aligned and provide additive resistive force when said slide member is moved from said energizing "on" position to said emergency "off" position.

* * * * *